US009417867B2

(12) United States Patent
Abuelsaad et al.

(10) Patent No.: US 9,417,867 B2
(45) Date of Patent: Aug. 16, 2016

(54) SMART SOURCE CODE EVALUATION AND SUGGESTION SYSTEM (71) Applicant: International Business Machines Corporation, Armonk, NY (US)

(72) Inventors: Kelly Abuelsaad, Somers, NY (US); Shane B. McElligott, Apex, NC (US); Hien Q. Nguyen, Beaverton, OR (US); Susan M. Romero, Seattle, WA (US); Jeffrey D. Young, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 14/249,818

(22) Filed: Apr. 10, 2014

(65) Prior Publication Data

US 2015/0293762 A1 Oct. 15, 2015

(51) Int. Cl.
*G06F 9/44* (2006.01)
(52) U.S. Cl.
CPC .. *G06F 8/70* (2013.01); *G06F 8/71* (2013.01); *G06F 8/72* (2013.01)
(58) Field of Classification Search
None
See application file for complete search history.

(56) References Cited

U.S. PATENT DOCUMENTS

| 7,110,991 | B2 * | 9/2006 | Arnold | G06F 17/30442 |
| 7,503,035 | B2 | 3/2009 | Zeidman | |
| 7,614,040 | B2 | 11/2009 | Wagner et al. | |
| 8,037,452 | B2 | 10/2011 | Minimum et al. | |
| 8,266,585 | B2 | 9/2012 | Funto et al. | |
| 8,271,939 | B1 | 9/2012 | Krishnaiyer et al. | |
| 8,375,361 | B2 | 2/2013 | Bell et al. | |
| 8,434,054 | B2 | 4/2013 | Wagner et al. | |
| 9,128,801 | B2 * | 9/2015 | Fox | G06F 8/36 |
| 9,141,378 | B2 * | 9/2015 | Fox | G06F 8/70 |
| 9,176,729 | B2 * | 11/2015 | Mockus | G06F 8/70 |
| 9,311,077 | B2 * | 4/2016 | Klinger | G06F 8/71 |
| 2007/0168946 | A1 | 7/2007 | Drissi et al. | |
| 2008/0178079 | A1 * | 7/2008 | Chen | G06F 17/30442 715/700 |
| 2009/0083268 | A1 | 3/2009 | Coqueret et al. | |
| 2009/0249298 | A1 * | 10/2009 | Blount | G06F 8/70 717/125 |
| 2009/0254538 | A1 | 10/2009 | Arthurs et al. | |

(Continued)

OTHER PUBLICATIONS

Ying et al., "Predicting source code changes by mining change history," 2004, IEEE Transactions on Software Engineering vol. 30, Issue 9, pp. 574-586.*

(Continued)

*Primary Examiner* — Thuy Dao
*Assistant Examiner* — Stephen Berman
(74) *Attorney, Agent, or Firm* — Yee & Associates, P.C.; Lisa J. Ulrich (57) ABSTRACT

A method for s identifying program files within one or more programs that will likely require update to implement a proposed programming task is disclosed. A processor identifies a previous programming task that matches the proposed programming task. The processor also identifies a set of program files that were updated to implement the previous programming task. The processor then displays the set of program files or existing versions of the set of program files as program files that will likely require update for the proposed programming task.

20 Claims, 5 Drawing Sheets

(56) References Cited

U.S. PATENT DOCUMENTS

| | | | | |
|---|---|---|---|---|
| 2010/0070948 A1* | 3/2010 | Rama | ................. | G06F 8/72 717/105 |
| 2010/0299305 A1* | 11/2010 | Laxman | ................. | G06F 8/71 707/609 |
| 2011/0209119 A1* | 8/2011 | Duesterwald | ................. | G06F 8/72 717/122 |
| 2011/0219360 A1* | 9/2011 | Srinivasa | ................. | G06F 17/30 717/124 |
| 2012/0210298 A1 | 8/2012 | Hodgins et al. | | |
| 2012/0291012 A1 | 11/2012 | Robison et al. | | |
| 2012/0311540 A1 | 12/2012 | Fanning et al. | | |
| 2014/0196010 A1* | 7/2014 | Balachandran | ................. | G06F 8/71 717/124 |
| 2015/0268939 A1* | 9/2015 | Kelapure | ................. | G06F 8/40 717/112 |

OTHER PUBLICATIONS

Weissgerber et al., "Identifying Refactorings from Source-Code Changes," 2006, 21st IEEE/ACM International Conference on Automated Software Engineering (ASE'06), pp. 231-240.*

Higo et al., "Refactoring Support Based on Code Clone Analysis," 2004, Product Focused Software Process Improvement, vol. 3009 of the series Lecture Notes in Computer Science, pp. 220-233.*

Anonymous, "Method to Capture Defect Owner in a Heavily Componented Source Code," IP.com Prior Art Database Technical Disclosure No. IPCOM000218312D, Jun. 1, 2012, 7 pages.

Malheiros et al., "A Source Code Recommender System to Support Newcomers," Proceedings of the 2012 IEEE 36th International Conference on Computer Software and Applications, Jul. 2012, pp. 19-24.

* cited by examiner

| | PROGRAMMING TASK | OWNER | DATE | STATUS | TAGS |
|---|---|---|---|---|---|
| 302 | ADD IMAGES TO REPOSITORY | JEFF.Y | 05/21/12 | DELIVERED | IMAGE, ASSET, REPOSITORY |
| 304 | ADD BACKUP BUTTON TO USER INTERFACE | SUSAN.R | 07/04/12 | IN PROGRESS | UI, OPERATION |
| 306 | VALIDATE PUBLIC INTERNET PROTOCOL ADDRESS | HIEN.N | 03/21/12 | DELIVERED | NETWORK, DATA INTEGRITY |

SMART SOURCE CODE EVALUATION AND SUGGESTION SYSTEM

BACKGROUND OF THE INVENTION

1. Field of the Invention

The present invention relates generally to data processing and, in particular, to managing programming tasks. Still more particularly, the present disclosure relates to a method and apparatus for identifying program files to be updated for a programming task.

2. Description of the Related Art

When a software developer is asked to update program code to implement a new function, the software developer typically needs to determine which existing program files to update and whether new program files should be added, and then code the updates and new program files. Often it is difficult to determine which existing program files to update, especially if the software developer is unfamiliar with the program code.

It was known for a software developer to use a source code recommender system to get a recommendation of files to be updated for a program change request. For example, Malheiros et al., "A Source Code Recommender System To Support Newcomers", IEEE/COMPSAC 36th Annual International Conference on, 16-20 Jul. 2012, Pages 19-24 (Hereinafter Malheiros) discloses recommending files for a change request base on files changed in previous change requests that are similar to the change request. Malheiros discloses making the recommendations based on an assumption that similar change requests have similar solutions. To find the source code files related to an open change request, Malheiros looks for similar change requests that were solved in the past and recommends the files changed to solve them as the related files of the open change request. Malheiros ranks the similarity of the previous change requests to the open change request by similarity of text in change request summaries, change request descriptions, and comments made by developers in the change requests.

However, merely comparing similarity of text in change request summaries, change request descriptions, and comments made by developers in the change requests to identify similar previous change requests can lead to false positive identification of previous change requests that are not useful. For example, the text in a previous change request may include a phrase that falsely makes it appear to be similar to the open change request. Merely comparing similarity of text in change request summaries, change request descriptions, and comments made by developers in the change requests to identify similar previous change requests can also lead to not identifying previous change requests that should be identified, and can further lead to incorrect ranking of similarity between the open change request and previous change requests.

An object of the present invention is to provide a computer-implemented process to determine which existing program files will likely require update to perform a current programming task.

SUMMARY

In one illustrative embodiment, a method, apparatus, and computer program product for identifying program files within one or more programs that will likely require update to implement a proposed programming task is disclosed. An apparatus identifies a previous programming task that matches the proposed programming task. The apparatus also identifies a set of program files that were updated to implement the previous programming task. The apparatus then displays the set of program files as program files that will likely require update for the proposed programming task.

DETAILED DESCRIPTION OF THE PREFERRED EMBODIMENT

Figure 1:
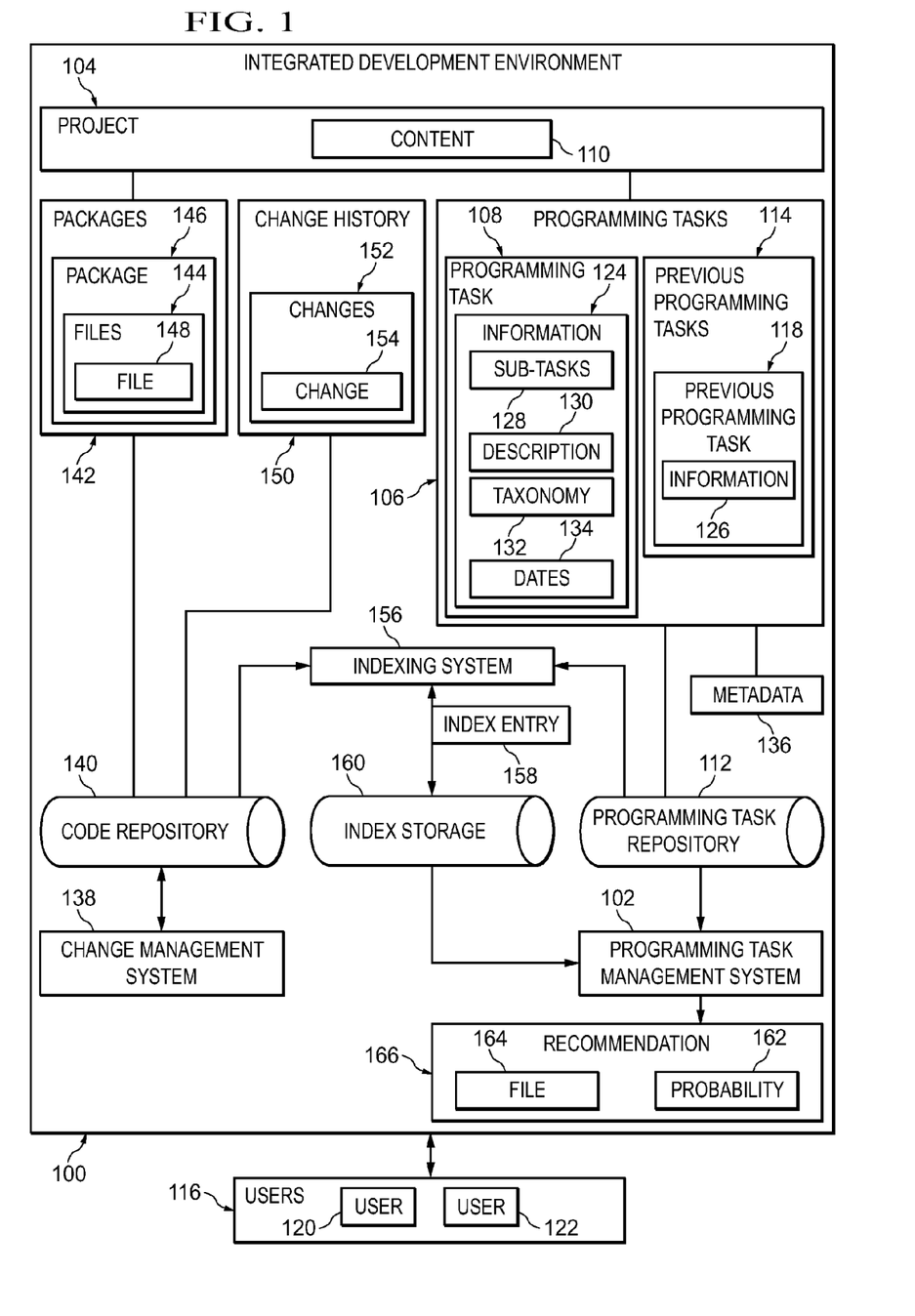
FIG. 1 is an illustration of an integrated development environment in accordance with an illustrative embodiment.

With reference now to the figures and, in particular, with reference to FIG. 1, an illustration of an integrated development environment is depicted in accordance with an illustrative embodiment. In these illustrative examples, integrated development environment 100 includes programming task management system 102. As depicted, programming task management system 102 is used in a process for identifying program files within one or more programs that will likely require update to implement programming tasks 106 of project 104. In this illustrative example, programming task management system 102 may be implemented using at least one of hardware, software, and a combination of hardware and software of a data processing system.

As depicted, programming tasks 106 are modifications to project 104 that can be identified and isolated in integrated development environment 100. Project 104 is one or more products that can be bought, sold, distributed, and serviced. Project 104 may be at least one of hardware, software, or a combination of hardware and software. As depicted, programming task 108 is an illustrative example of a programming task in programming tasks 106. For example, programming task 108 may be at least one of adding content 110 to project 104, modifying content 110 in project 104, and removing content 110 from project 104, or other suitable types of changes to content 110 in project 104.

In the illustrated example, content 110 in project 104 is at least one of software of project 104, hardware of project 104, data processed by project 104, and other suitable types of content for project 104. For example, programming task 108 may be a feature to add content 110 to project 104. As another example, programming task 108 may be to fix a problem associated with content 110 of project 104.

In this illustrative example, programming task management system 102 communicates with programming task repository 112 to manage programming tasks 106. As depicted, programming task management system 102 may use programming task repository 112 to retrieve, save, modify, or delete one or more programming tasks in programming tasks 106. Programming task repository 112 include programming tasks 106. For example, programming task repository 112 may be implemented using a computer readable storage device. As another example, programming task repository 112 may be a file in a computer readable storage device of a data processing system. As still another example, programming tasks 106 may be stored in programming task repository 112 as a list of programming tasks in a memory of a data processing system.

As depicted, previous programming tasks 114 include one or more programming tasks in programming tasks 106 previously worked on by one or more of users 116. Previous programming task 118 is an illustrative example of a previous programming task in previous programming tasks 114.

In these illustrative examples, one or more programming tasks in programming tasks 106 may be assigned to at least one user in users 116. In this illustrated example, user 120 in users 116 is assigned to programming task 108 and user 122 in users 116 is assigned to previous programming task 118.

In the illustrated example, programming task 108 includes information 124 about programming task 108 and previous programming task 118 includes information 126 about previous programming task 118. As depicted, information 124 includes at least one of sub-tasks 128 of programming task 108, description 130 of programming task 108, taxonomy 132 of programming task 108, dates 134 associated with programming task 108, or any other suitable information about programming task 108 in integrated development environment 100. In the illustrated example, sub-tasks 128 are portions of programming task 108. Sub-Tasks 128 may be assigned to at least one user in users 116 to complete. For example, when a number of sub-tasks in sub-tasks 128 have been completed by users 116, programming task 108 may also be determined to be completed.

In this illustrated example, description 130 specifies one or more modifications to project 104. Description 130 may be in a human readable format or some other document format suitable for providing a mental image to a user of what programming task 108 entails. For example, description 130 may be in the form of text, markup language text, or other suitable formats for describing programming task 108 in integrated development environment 100. In the illustrative example, description 130 includes at least one of a name of the programming task, a title of the programming task, a phrase explaining what the programming task is about or other suitable descriptions for programming tasks in integrated development environment 100.

As depicted, taxonomy 132 of programming task 108 is a classification describing programming task 108 according to one or more relationships between programming task 108 and other programming tasks in programming tasks 106. For example, taxonomy 132 may be a string of text with dots that separate one or more sub-classes of any number of classifications of programming tasks in programming tasks 106, a graph of nodes for one or more sub-classes and having edges between associated sub-classes of programming tasks in programming tasks 106, a set of tags selected for programming task 108 from any number of classifications of programming tasks in programming tasks 106, or any other suitable type of format for classifying programming tasks in programming tasks 106 in integrated development environment 100. More detail describing taxonomy 132 is provided below in FIG. 4.

In the illustrative example, dates 134 associated with programming task 108 is at least one of when programming task 108 is due to be started or completed, when sub-tasks 128 in programming task 108 are due to be started or completed, when sub-tasks 128 have been completed, or any other suitable type of dates for information 124 about programming task 108. For example, dates 134 may include a date selected by a user in users 116 for when programming task 108 is to be completed, and a second date indicating whether sub-tasks 128 have been completed.

As depicted, metadata 136 for programming tasks 106 is data about programming tasks 106. Metadata 136 is at least one of time stamps identifying when programming tasks in programming tasks 106 were created, time stamps identifying when programming tasks in programming tasks 106 were last updated, locations where programming tasks in programming tasks 106 are stored, format descriptions specifying how information for programming tasks in programming tasks 106 is specified, or other suitable types of metadata about programming tasks in programming tasks 106. For example, metadata 136 may include a first date when a user in users 116 used programming task management system 102 to define programming task 108 and a universal resource locator pointing to where information 124 is located. In the illustrated example, metadata 136 may be generated by programming task management system 102 or other suitable hardware and software components in integrated development environment 100. In theses illustrative examples, metadata 136 is stored in programming task repository 112 or component suitable for storing metadata about programming tasks 106 in integrated development environment 100.

In this illustrated example, programming task management system 102 searches previous programming tasks 114 for programming tasks matching programming task 108. As depicted, programming task management system 102 compares information 124 about programming task 108 with previous programming tasks 114 to identify one or more programming tasks in previous programming tasks 114 matching programming task 108. In this illustrated example, programming task management system 102 makes a determination that previous programming task 118 is matched with programming task 108 based on a comparison between information 124 for programming task 108 and information 126 for previous programming task 118. The determination that programming task 108 is matched with previous programming task 118 is based on at least one of a comparison between taxonomy 132 in information 124 and taxonomy in information 126; a comparison between sub-tasks 128 in information 124 and tasks in information 126; a comparison between description 130 and a description in information 126; a comparison between metadata in metadata 136 for programming task 108 and metadata in metadata 136 for previous programming task 118; or other suitable types of comparisons for determining whether previous programming task 118 matches programming task 108 in integrated development environment 100.

As depicted, change management system 138 communicates with code repository 140 to manage packages 142 of files 144 associated with project 104. In this illustrative example, package 146 is an example of a package in packages 142 and file 148 is an example of a file in files 144. As used herein, a package is a number of files. In this illustrative example, one or more files in files 144 include at least one of computer program instructions for building project 104, computer program instructions for one or more programs, one or more libraries, and other suitable types of components for processing data in project 104, hardware design information for hardware components used in project 104, data processed by hardware and software components of project 104, or other suitable types of information or data associated with project 104.

In this illustrative example, change management system 138 communicates with code repository 140 to manage packages 142. As depicted, change management system 138 may use code repository 140 to retrieve, save, modify, or delete one or more packages in packages 142. As also depicted, change management system 138 may use code repository 140 to retrieve, save, modify, or delete one or more files in packages in packages 142. In this illustrated example, code repository 140 at least includes file 148 in package 146. For example, code repository 140 may be implemented using a computer readable storage device. As another example, code repository 140 may be a file in a computer readable storage device of a data processing system. As still another example, packages 142 and files 144 in packages 142 may be stored in code repository 140 as a list of packages 142 in a memory of a data processing system having a list of links in the memory of the data processing system to files in the memory of the data processing system.

In this illustrated example, change management system 138 generates change history 150 for changes 152 to packages 142. Changes 152 in change history 150 are a record of changes to packages 142 in integrated development environment 100. Changes 152 to packages 142 are at least one of packages being added, removed, or modified in packages 142, or files being added, removed, or modified in files 144 in packages 142. For example, changes in changes 152 to particular files in files 144 are records of when the particular files were added, removed or modified.

As depicted, change 154 in changes 152 is an example of a modification to file 148. In the illustrative example, change 154 includes at least one of a user in users 116 who approved the modification to file 148, a user in users 116 who made the modification, a description of the modification provided by a user in users 116, data specifying the modification made to file 148, or other suitable information for recording change 154 to file 148 in integrated development environment 100. For example, change 154 may include user 120 adding particular text to a portion of file 148. In this example, change 154 may be one or more particular lines of code added or changed in file 148.

As depicted, indexing system 156 is at least one of hardware, software, and a combination of hardware and software of a data processing system in integrated development environment 100. In the illustrated examples, indexing system 156 identifies information contained within at least one of change history 150, programming tasks 106, or metadata 136. For example, indexing system 156 may identify change 154 to file 148, information 124 in programming task 108, information 126 in previous programming task 118, and metadata in metadata 136 about programming task 108 and previous programming task 118.

In this illustrative example, indexing system 156 identifies change 154 to file 148 by scanning code repository 140. Indexing system 156 identifies information 124 in programming task 108, information 126 in previous programming task 118, and metadata in metadata 136 by scanning programming task repository 112.

As depicted, indexing system 156 may associate changes 152 in change history 150 with previous programming tasks 114 in programming tasks 106 by comparing previous programming tasks 114 with changes 152. Indexing system 156 may also associate changes 152 in change history 150 with previous programming tasks 114 in programming tasks 106 by comparing metadata for previous programming tasks 114 in metadata 136 with changes 152. In this illustrative example, indexing system 156 associates change 154 to file 148 with previous programming task 118 based on a comparison of information 126 in previous programming task 118 and change 154.

In the illustrated example, indexing system 156 generates index entry 158. Index entry 158 includes change 154 to file 148 associated with previous programming task 118. Index entry 158 is discussed in more detail in the description of FIG. 2 below.

As also depicted, indexing system 156 may store index entry 158 in index storage 160. In these illustrative examples, index storage 160 includes index entries such as index entry 158. For example, index storage 160 may be implemented using a computer readable storage device. For example, index storage 160 may be a file in a computer readable storage device of a data processing system.

In these illustrative examples, index storage 160 may be in the form of a set, a list, a table and any other suitable structure for index entries in integrated development environment 100. For example, index entries may be stored in index storage 160 as rows of a table in a database. As another example, index entries may be stored in index storage 160 as a list of index entries in a memory of a data processing system.

Indexing system 156 may also modify index entry 158 in index storage 160. In this illustrative example, indexing system 156 may modify index entry 158 in response to a change to at least one of change history 150 and previous programming tasks 114. For example, indexing system 156 may modify index entry 158 in index storage 160 based on a modification to change 154. Change 154 in change history 150 may, for example, have been modified in change history 150. As another example, indexing system 156 may modify index entry 158 in index storage 160 based on a change to information 126 in previous programming task 118.

Indexing system 156 may further delete index entry 158 in index storage 160. In this illustrative example, indexing system 156 may delete index entry 158 in response to a change to at least one of change 154 and information 126. For example, indexing system 156 may delete index entry 158 in index storage 160 based on a modification to change 154. Change 154 may, for example, have been have been removed from change history 150. As another example, a change to information 126 may result in indexing system 156 determining that change 154 is no longer associated with previous programming task 118.

In this illustrative example, programming task management system 102 matches programming task 108 to previous programming task 118 based on a comparison of information 126 in previous programming task 118 and information 124 in programming task 108. As depicted, programming task management system 102 may also determine probability 162 that file 164 or an existing version of file 164 will need to be modified to complete programming task 108 based on the association of previous programming task 118 with change 154 and the matching of previous programming task 118 to programming task 108. In the illustrative examples, probability 162 is a frequency with which versions of file 164 are modified to complete programming tasks in previous programming tasks 114 that are identified as matching programming task 108.

As depicted, responsive to determining probability 162 that file 164 or existing version of file 164 needs to be modified for programming task 108, programming task management system 102 generates recommendation 166 to modify file 164 for programming task 108. For example, responsive to determining probability 162 that file 164 will likely require update for programming task 108, programming task management system 102 may then display file 164 as a program file that will likely require update for programming task 108. As another example, responsive to determining probability 162 that file 164 or existing version of file 164 will likely require update for programming task 108, programming task management system 102 may then display file 164 or existing version of file 164 as a program file that will likely require update for programming task 108.

The illustration of integrated development environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

In some illustrative examples, additional data processing systems may be present within integrated development environment 100. For example, networking applications may be run within integrated development environment 100. Networking applications within integrated development environment 100 may include at least one of web servers, web browsers or other suitable application configured to provide a user interface for programming task management system 102. For example, a user in users 116 may interact with the user interface for programming task management system 102 through a web browser that is communicating with a web server.

As another example, instead of indexing system 156 identifying change 154 to file 148 by scanning code repository 140, indexing system 156 may identify change 154 to file 148 when change management system 138 is used to make change 154. For example, change management system 138 may communicate change 154 to indexing system 156 concurrent with storing change 154 in change history 150.

Also, although change management system 138 and indexing system 156 are shown as separate blocks in integrated development environment 100, all or a portion of these may also be implemented in programming task management system 102 or other suitable components in integrated development environment 100. In these illustrative examples, integrated development environment 100 may be implemented by any combination of hardware and software products, and may also be implemented in one or more computer systems or a cluster of computer systems.

Figure 2:
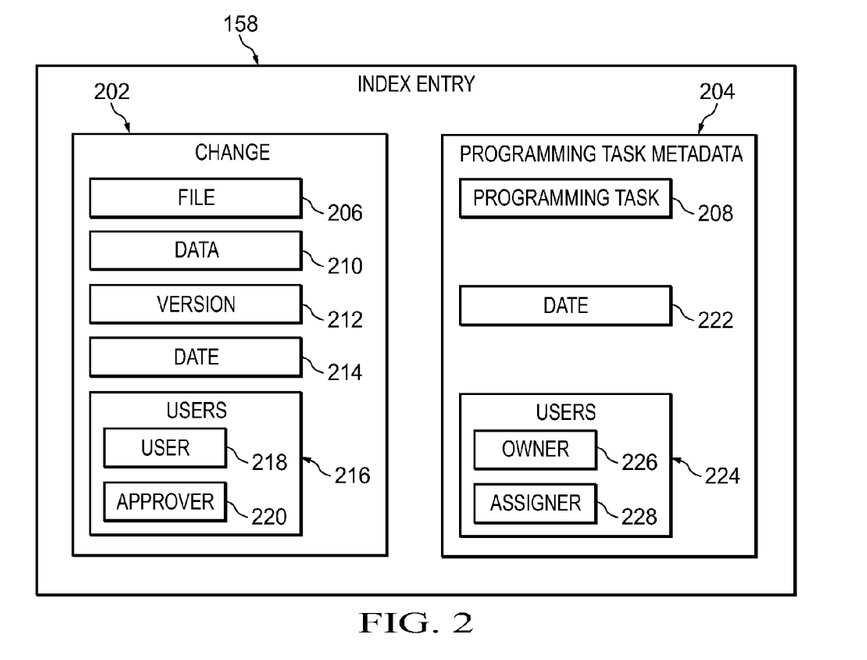
FIG. 2 is a block diagram of an index entry for a change to a program file associated with a programming task in accordance with an illustrative embodiment.

Turning now to FIG. 2, a block diagram of an example of an index entry for a change to a program file associated with a programming task is depicted in accordance with an illustrative embodiment. Index entry 158 in FIG. 2 is an example of index entry 158 in FIG. 1.

As depicted, index entry 158 includes change 202 associated with programming task metadata 204. Change 202 is an example of change 154 in FIG. 1. Programming task metadata 204 is an example of metadata in metadata 136 in FIG. 1 for previous programming task 118 in FIG. 1. As also depicted, change 202 includes file 206 that was changed by change 202, data 210 changed in file 206 by change 202, version 212 of file 206 created by change 202, date 214 that change 202 was made and users 216 involved with change 202. File 206 is an example of file 148 in FIG. 1. In this illustrated example, users 216 involved with change 202 include user 218 that made change 202 and approver 220 that approved change 202. For example, data 210 is an example of information that was changed in file 206 on date 214 by user 218 approved by approver 220.

In this illustrative example, programming task metadata 204 includes programming task 208 pointed to by programming task metadata 204, date 222 that programming task 208 was created or assigned to be completed, and users 224 associated with programming task 208. In the illustrated example, users 224 associated with programming task 208 include owner 226 assigned to programming task 208 and assigner 228 that assigned programming task 208 to owner 226.

As depicted, change 202 may be associated with programming task metadata 204 based on at least one of a match between user 218 and owner 226, a match between approver 220 and assigner 228, a match between approver 220 and owner 226, a match between data 210 and information for programming task 208, a match between file 206 and information for programming task 208, a match between date 214 and date 222, and any other suitable matches between change 202 and programming task metadata 204.

Figure 3:
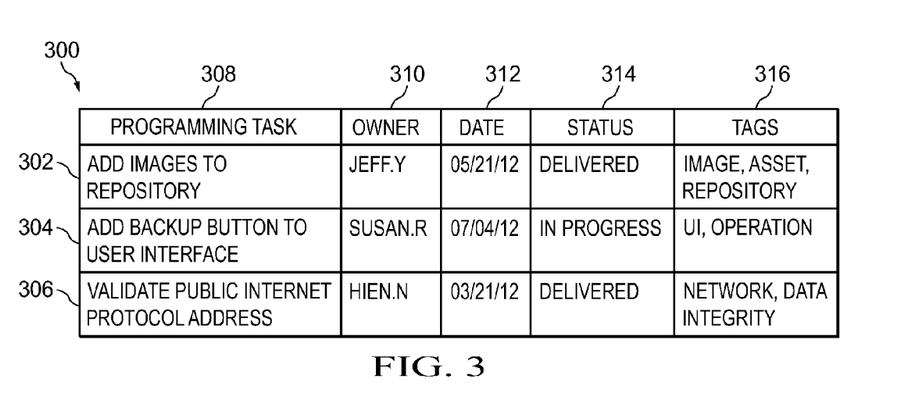
FIG. 3 is an illustration of examples of programming tasks in accordance with an illustrative embodiment.

With reference now to FIG. 3, examples of programming tasks are depicted in accordance with an illustrative embodiment. Table 300 in FIG. 3 is an example of programming tasks 106 in FIG. 1. Programming task 302, programming task 304, and programming task 306 in table 300 are examples of programming tasks in programming tasks 106 in FIG. 1. As depicted, column 308 of table 300 includes examples of description 130 in programming task 108 in FIG. 1. Column 310 of table 300 includes examples of users in users 116 assigned as owners of programming task 302, programming task 304, and programming task 306. Column 312 of table 300 includes examples of a date in dates 134 in programming task 108 in FIG. 1 that indicates when programming tasks were created. Column 314 of table 300 includes examples of status of a date in dates 134 in programming task 108 in FIG. 1 that indicates whether programming tasks have been completed. As depicted, column 316 of table 300 includes examples of taxonomy 132 in programming task 108 in FIG. 1 in the form of tags selected for classifying programming task 302, programming task 304, and programming task 306.

Figure 4:
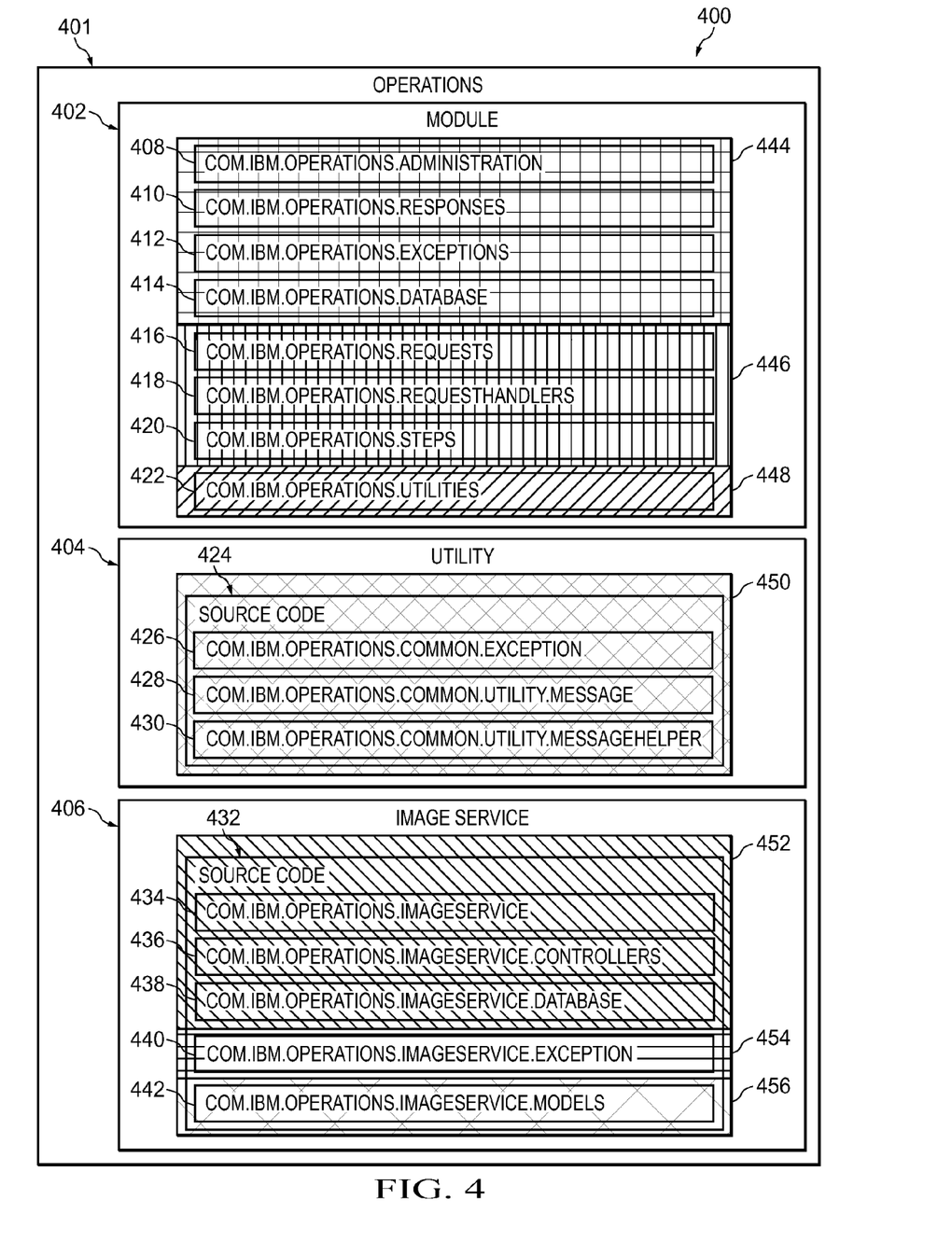
FIG. 4 is an illustration of a graphical user interface suggesting program files that will likely require update for a proposed programming task in accordance with an illustrative embodiment.

Turning next to FIG. 4, an illustration a graphical user interface suggesting files that will likely require update for a proposed programming task is depicted in accordance with an illustrative embodiment. In this illustrative example, user interface 400 is an example of one implementation for a graphical user interface for suggesting files that will likely require update for a proposed programming task in integrated development environment 100 in FIG. 1. For example, user interface 400 may be used to display recommendation 166 in FIG. 1 to user 120 in users 116 in FIG. 1.

As depicted user interface 400 includes operations 401. Operations 401 in FIG. 4 is an example of a package in packages 142 of project 104 in FIG. 1. As depicted, operations 401 includes module 402, utility 404, and image service 406. Module 402, utility 404, and image service 406 are examples of packages in packages 142. In the illustrated example, operations 401 is a window displaying information about module 402, utility 404, and image service 406 packages.

In the illustrative example, module 402 includes universal resource locator 408, universal resource locator 410, universal resource locator 412, universal resource locator 414, universal resource locator 416, universal resource locator 418, universal resource locator 420, and universal resource locator 422. In this illustrative example, utility 404 includes source code 424. As depicted, source code 424 is an example of files 144 in package 146 in FIG. 1. Source code 424 includes universal resource locator 424, universal resource locator 426, universal resource locator 428, and universal resource locator 430. In this illustrative example, image service 406 includes source code 432. As depicted, source code 432 is another example of files 144 in package 146 in FIG. 1. Source code 432 includes universal resource locator 432, universal resource locator 434, universal resource locator 436, universal resource locator 438, universal resource locator 440, and universal resource locator 442.

As depicted, by using different types of shading, color coding 444, color coding 446, color coding 448, color coding 450, color coding 452, color coding 454, and color coding 456 are used to highlight portions of module 402, utility 404, and image service to be updated for a programming task. For example, color coding 444 may indicate where text is displayed using the color red to identify files that are usually updated. In this example, color coding 446 may indicate where text is displayed using orange to identify files that are usually updated, and color coding 448 may indicate where text is displayed using blue to identify files occasionally updated. As another example, color coding 444, color coding 446, color coding 448, color coding 450, color coding 452, color coding 454, and color coding 456 may also indicate where text is highlighted using different background colors, different background images, or some other suitable combination of text colors, background colors, and background images to identify files to be updated for a programming task.

Figure 5:
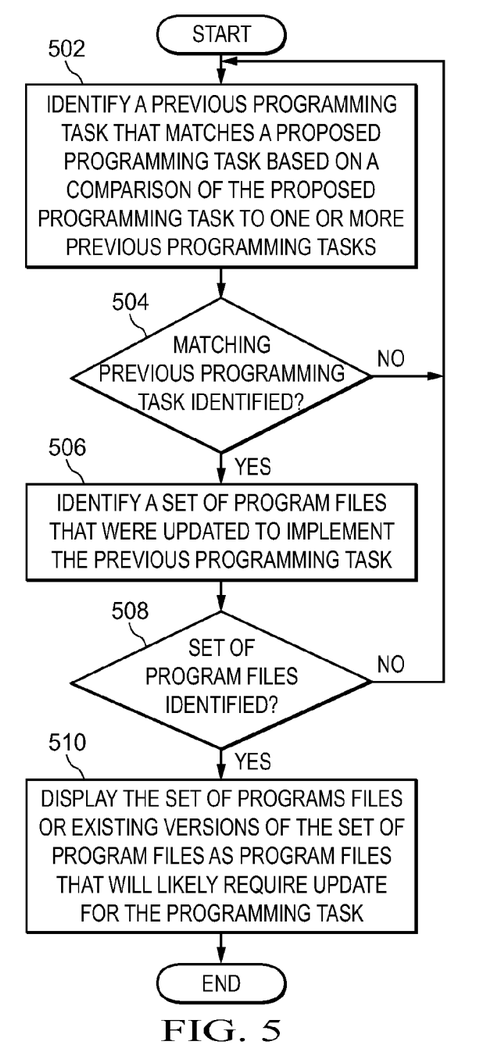
FIG. 5 is a flowchart of a process for identifying program files within one or more programs that will likely require update to implement a programming task in accordance with an illustrative embodiment.

With reference next to FIG. 5, an illustration of a flowchart of a process for identifying program files within one or more programs that will likely require update to implement a programming task is depicted in accordance with an illustrative embodiment. The steps illustrated in FIG. 5 are examples of steps that may be used to process programming tasks 106 in FIG. 1. These steps may be implemented in integrated development environment 100 in FIG. 1. For example, the steps illustrated in FIG. 5 may be performed by programming task management system 102 in FIG. 1, change management system 138 in FIG. 1, and indexing system 156 in FIG. 1.

The process begins by identifying a previous programming task that matches a proposed programming task based on a comparison of the proposed programming task to one or more previous programming tasks (step 502). The previous programming task in one or more previous programming tasks in the process in FIG. 5 is an example of previous programming task 118 in previous programming tasks 114 in FIG. 1. The proposed programming task in the process in FIG. 5 is an example of programming task 108 in programming tasks 106 in FIG. 1.

A determination is made as to whether the previous programming task matching the proposed programming task has been identified based on the comparison (step 504). If the process has not identified the previous programming task, the process goes back to step 502 to continue identifying. For example, the process may subsequently identify the previous programming task matching the proposed programming task based on user input matching the proposed programming task with the previous programming task. As another example, the process may identify a subsequent programming task matching the proposed programming task instead of the previous programming task. For example, the proposed programming task may have been created before the subsequent programming task, but the subsequent programming task may have been worked on before the proposed programming task. In this example, the subsequent programming task is used as the previous programming task in these steps because the subsequent programming task was worked on before the proposed programming task.

After the process has identified the previous programming task, the process next identifies a set of program files that were updated to implement the previous programming task (step 506). A determination is made as to whether the set of files has been identified (step 508). If the process has not identified the previous programming task, the process goes back to step 502 to continue identifying. Otherwise, the process then displays the set of program files or existing versions of the set of program files as program files that will likely require update for the programming task (step 510) with the process terminating thereafter. The display of the set of program files or existing versions of the set of program files as program files that will likely require update for the programming task is an example of recommendation 166 in FIG. 1. The process in FIG. 5 may be repeated any number of times to process additional proposed programming tasks.

Figure 6:
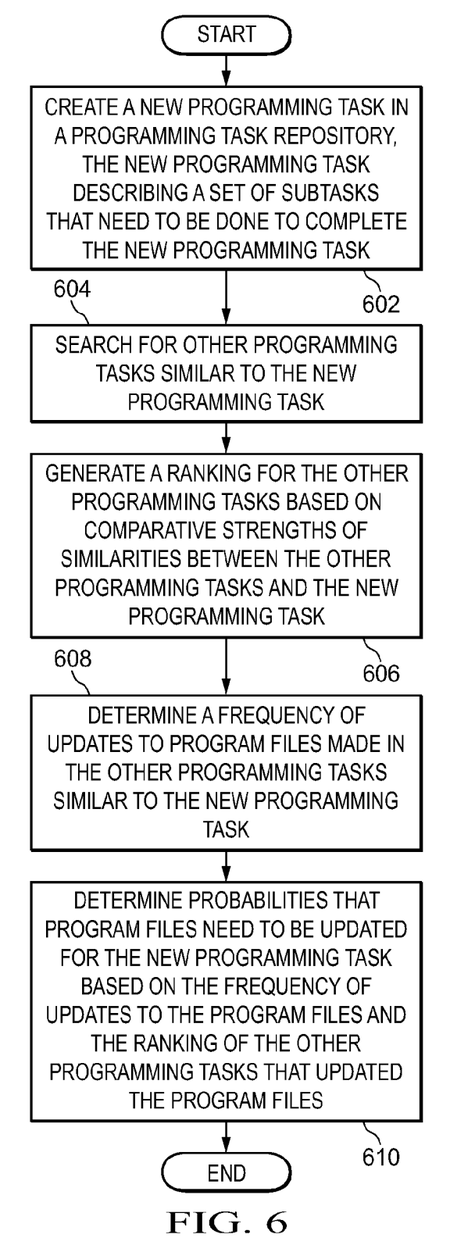
FIG. 6 is a flowchart of a process for determining probabilities that program files will need to be updated for a new programming task in accordance with an illustrative embodiment.

With reference next to FIG. 6, an illustration of a flowchart of a process for determining probabilities that program files will need to be updated for a new programming task is depicted in accordance with an illustrative embodiment. The steps illustrated in FIG. 6 are examples of steps that may be used to process programming tasks 106 in FIG. 1. These steps may be implemented in integrated development environment 100 in FIG. 1. For example, the steps illustrated in FIG. 6 may be performed by programming task management system 102 in FIG. 1, change management system 138 in FIG. 1, and indexing system 156 in FIG. 1.

The process begins by creating a new programming task in a programming task repository (step 602). In this example, the new programming task describes a set of sub-tasks that need to be done to complete the new programming task. The new programming task is an example of programming task 108 in FIG. 1. The programming task repository in FIG. 5 is an example of programming task repository 112 in FIG. 1.

The process searches for other programming tasks similar to the new programming task (step 604). The other programming tasks similar to the new programming task are selected from programming tasks 106 in FIG. 1.

The process next generates a ranking for the other programming tasks based on comparative strengths of similarities between the other programming tasks and the new programming task (step 606). Strength of a similarity between the other programming tasks and the new programming task includes determining to what degree information in the other programming tasks match information in the new programming task. For example, a first programming task in the other programming tasks may have two of three tags in a taxonomy of the first programming task that match two of three tags in a taxonomy of the new programming task, and a second programming task in the other programming tasks may have one of three tags in a taxonomy of the second programming task that match one of the three tags in the taxonomy of the new programming task. In this example, the first programming task may be determined to have a greater similarity with the new programming task than the similarity between the second programming task and the new programming task based on a percentage of matching tags.

As depicted, the process next determines a frequency of updates to program files made in the other programming tasks similar to the new programming task (step 608). The process then determines probabilities that program files needs to be updated for the new programming task based on the frequency of updates to the program files and the ranking of the other programming tasks that updated the program files (step 610) with the process terminating thereafter. The probabilities are examples of probability 162 in FIG. 1. The process in FIG. 6 may be repeated any number of times to process additional programming tasks.

Figure 7:
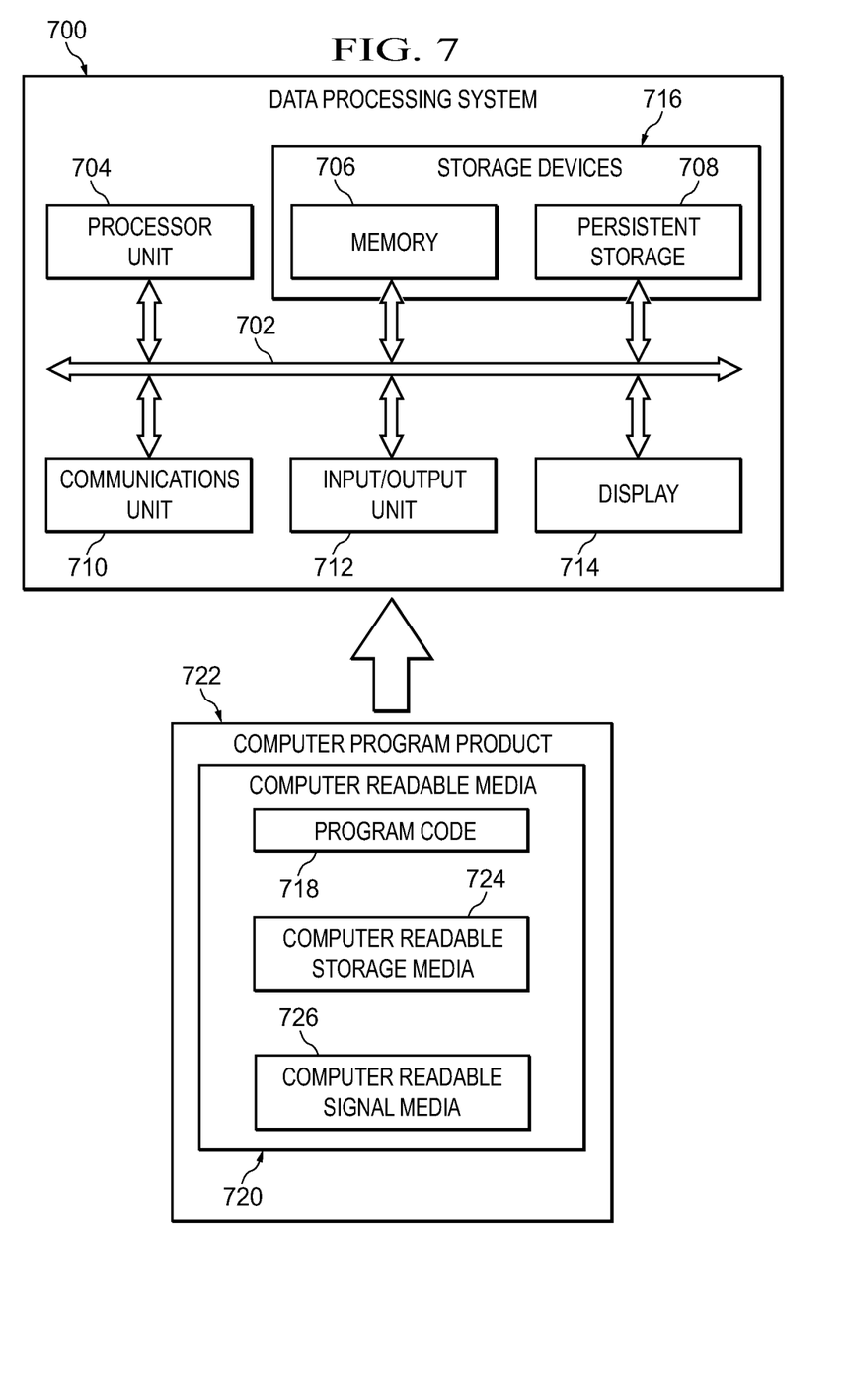
FIG. 7 is an illustration of a data processing system in accordance with an illustrative embodiment.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement the process of suggesting files to be updated for a programming task in an integrated development environment. More particularly, data processing system 700 is an example of a data processing system that may be used to implement programming task management system 102, change management system 138, and indexing system 156 in FIG. 1.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a method, apparatus, and computer program product for identifying program files within one or more programs that will likely require update to implement a proposed programming task. In one example, a program runs in a computer system and identifies a previous programming task that matches the proposed programming task. The program also identifies a set of program files that were updated to implement the previous programming task. The program then displays the set of program files or existing versions of the set of program files as program files that will likely require update for the proposed programming task.

In another example, responsive to program identifying the set of program files that were updated to implement the previous programming task, the program generates a recommendation that the set of program files or existing versions of the set of program files be updated based on a history of changes for the set of program files that were updated to implement the previous programming task. In this example, the recommendation may include probabilities for the set of program files that each program file will need to be updated to implement the proposed programming task. As an example, the recommendation may include presenting the set of program files with a color coding that is based on the probabilities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying program files within one or more programs that will likely require update to implement a proposed programming task, the method comprising:
    identifying, by a processor, a previous programming task, in a memory, that matches the proposed programming task, in a programming task management system using a programming task repository, wherein a programming task is a modification, that can be identified and isolated in an integrated development environment, including a feature to add content or to fix a problem associated with the content to a project, and wherein the programming task includes information comprising at least one selected from a group consisting of sub-tasks of the programming task, a description of the programming task, a taxonomy of the programming task, and dates associated with the programming task, and wherein the description specifies one or more modifications to the project;
    identifying, by the processor, using a change history that is a record of changes to packages of files associated with the project in the integrated development environment, a set of program files that were updated to implement the previous programming task, wherein the change history including at least one selected from a group consisting of a user who approved the modification to a particular file, the user who made the modification, a description of the modification provided by the user, and data specifying the modification made to the particular file for recording the change to the particular file in the integrated development environment;
    determining a probability that a program file, as identified, or an existing version of the program file, as identified, will need to be modified to complete the proposed programming task using an association of the previous programming task with the change and matching of the previous programming task to the proposed programming task, wherein the probability is a frequency with which versions of the program file are modified to complete programming tasks in the previous programming task that are identified as matching the proposed programming task;
    responsive to determining the probability that the program file or the existing version of the program file is required to be modified for the proposed programming task, creating a recommendation to modify the program file for the proposed programming task, wherein the recommendation represents the set of program files, as identified, or existing versions of the set of program files, as identified, as program files that will likely require update for the proposed programming task;
    generating a user interface comprising the recommendation; and
    displaying the set of program files, as identified, or existing versions of the set of program files, as identified, as the program files that will likely require update for the proposed programming task in the recommendation in the user interface using visual cues to distinguish one set of program files from another set of program files.

2. The method of claim 1, wherein the proposed programming task includes an identification of a first taxonomy of the proposed programming task, the previous programming task includes an identification of a second taxonomy of the previous programming task, and wherein the identifying, by the processor, the previous programming task that matches the proposed programming task comprises comparing the first taxonomy to the second taxonomy.

3. The method of claim 1, wherein the identifying, by the processor, the previous programming task that matches the proposed programming task comprises comparing a first set of metadata for the proposed programming task to a second set of metadata for the previous programming task.

4. The method of claim 1, wherein the proposed programming task includes a first set of sub-tasks for the proposed programming task, the previous programming task includes a second set of sub-tasks for the previous programming task, and wherein the identifying, by the processor, the previous programming task that matches the proposed programming task comprises comparing the first set of sub-tasks to the second set of sub-tasks.

5. The method of claim 1, wherein the identifying, by the processor, the previous programming task that matches the proposed programming task comprises comparing a first high level textual description for the proposed programming task to a second high level textual description for the previous programming task.

6. The method of claim 1, further comprising:
responsive to identifying, by the processor, the set of program files that were updated to implement the previous programming task, the processor generating the recommendation that the set of program files or existing versions of the set of program files be updated based on a history of changes for the set of program files that were updated to implement the previous programming task.

7. The method of claim 6, wherein the recommendation includes an indication of the probability for a first program file in the set of program files or existing versions of the set of program files that the first program file will likely require update for the proposed programming task, wherein the probability is determined, by the processor, based on the history of changes.

8. The method of claim 6, wherein the visual cues associated with the recommendation include a color coding of the set of program files or existing versions of the set of program files based on probabilities that the set of program files or existing versions of the set of program files will need to be updated for the proposed programming task, wherein the probabilities are determined, by the processor, based on the history of changes.

9. The method of claim 1, wherein the proposed programming task and previous programming task are selected from a number of programming tasks stored in a code repository.

10. The method of claim 9, wherein the code repository includes a history of changes for a number of program files updated by the number of programming tasks.

11. The method of claim 1, wherein the proposed programming task is at least one of adding a feature to a product and fixing an issue with the product.

12. An apparatus for identifying program files within one or more programs that will likely require update to implement a proposed programming task, the apparatus comprising:
one or more processors, one or more computer-readable storage devices and one or more computer-readable memories;
first program instructions to identify a previous programming task in the one or more computer-readable memories that matches the proposed programming task, in a programming task management system using a programming task repository, wherein a programming task is a modification, that can be identified and isolated in an integrated development environment, including a feature to add content or to fix a problem associated with the content to a project, and wherein the programming task includes information comprising at least one selected from a group consisting of sub-tasks of the programming task, a description of the programming task, a taxonomy of the programming task, and dates associated with the programming task, and wherein the description specifies one or more modifications to the project;
second program instructions to identify using a change history that is a record of changes to packages of files associated with the project in the integrated development environment, a set of program files that were updated to implement the previous programming task, wherein the change history including at least one selected from a group consisting of a user who approved the modification to a particular file, the user who made the modification, a description of the modification provided by the user, and data specifying the modification made to the particular file for recording the change to the particular file in the integrated development environment;
third program instructions to determine a probability that a program file, as identified, or an existing version of the program file, as identified, will need to be modified to complete the proposed programming task using an association of the previous programming task with the change and matching of the previous programming task to the proposed programming task, wherein the probability is a frequency with which versions of the program file are modified to complete programming tasks in the previous programming task that are identified as matching the proposed programming task;
fourth program instructions responsive to determining the probability that the program file or the existing version of the program file is required to be modified for the proposed programming task, to create a recommendation to modify the program file for the proposed programming task, wherein the recommendation represents the set of program files, as identified, or existing versions of the set of program files, as identified, as program files that will likely require update for the proposed programming task;
fifth program instructions to generate a user interface comprising the recommendation; and
sixth program instructions to display the set of program files, as identified, or existing versions of the set of program files, as identified, as the program files that will likely require update for the proposed programming task in the recommendation in the user interface using visual cues to distinguish one set of program files from another set of program files, wherein the first program instructions, second program instructions, third program instructions, fourth program instructions, fifth program instructions and sixth program instructions are stored on the one or more computer-readable storage devices for execution by the one or more processors via the one or more computer-readable memories.

13. The apparatus of claim 12, wherein the fourth program instructions, responsive to determining the probability that the program file or the existing version of the program file is required to be modified for the proposed programming task, to create the recommendation that the set of program files or existing versions of the set of program files be updated based on a history of changes for the set of program files that were updated to implement the previous programming task, wherein the fourth program instructions are stored on the one or more computer-readable storage devices for execution by the one or more processors via the one or more computer-readable memories.

14. The apparatus of claim 13, wherein the recommendation includes an indication of the probability for a first program file in the set of program files or existing versions of the set of program files that the first program file will likely require update for the proposed programming task, wherein the probability is determined based on the history of changes.

15. The apparatus of claim 13, wherein the visual cues associated with the recommendation include a color coding of the set of program files or existing versions of the set of program files based on probabilities that the set of program files or existing versions of the set of program files will need to be updated for the proposed programming task, wherein the probabilities are determined based on the history of changes.

16. The apparatus of claim 12, wherein the proposed programming task and previous programming task are selected from a number of programming tasks stored in a code repository that includes a history of changes for a number of program files updated by the number of programming tasks.

17. A computer program product for identifying program files within one or more programs that will likely require update to implement a proposed programming task, the computer program product comprising:
 a computer readable storage medium having computer readable program code stored thereon, the computer readable program code for execution by a computer, comprising:
 computer readable program code for identifying a previous programming task, in a memory, that matches the proposed programming task, in a programming task management system using a programming task repository, wherein a programming task is a modification, that can be identified and isolated in an integrated development environment, including a feature to add content or to fix a problem associated with the content to a project, and wherein the programming task includes information comprising at least one selected from a group consisting of sub-tasks of the programming task, a description of the programming task, a taxonomy of the programming task, and dates associated with the programming task, and wherein the description specifies one or more modifications to the project;
 computer readable program code for identifying, using a change history that is a record of changes to packages of files associated with the project in the integrated development environment, a set of program files that were updated to implement the previous programming task, wherein the change history including at least one selected from a group consisting of a user who approved the modification to a particular file, the user who made the modification, a description of the modification provided by the user, and data specifying the modification made to the particular file for recording the change to the particular file in the integrated development environment;
 computer readable program code for determining a probability that a program file, as identified, or an existing version of the program file, as identified, will need to be modified to complete the proposed programming task using an association of the previous programming task with the change and matching of the previous programming task to the proposed programming task, wherein the probability is a frequency with which versions of the program file are modified to complete programming tasks in the previous programming task that are identified as matching the proposed programming task;
 computer readable program code responsive to determining the probability that the program file or the existing version of the program file is required to be modified for the proposed programming task, for creating a recommendation to modify the program file for the proposed programming task, wherein the recommendation represents the set of program files, as identified, or existing versions of the set of program files, as identified, as program files that will likely require update for the proposed programming task;
 computer readable program code for generating a user interface comprising the recommendation; and
 computer readable program code for displaying the set of program files, as identified, or existing versions of the set of program files, as identified, as the program files that will likely require update for the proposed programming task in the recommendation in the user interface using visual cues to distinguish one set of program files from another set of program files.

18. The computer program product of claim 17, further comprising:
 computer readable program code, responsive to identifying the set of program files that were updated to implement the previous programming task, for creating the recommendation that the set of program files or existing versions of the set of program files be updated based on a history of changes for the set of program files that were updated to implement the previous programming task.

19. The computer program product of claim 18, wherein the recommendation includes an indication of the probability for a first program file in the set of program files or existing versions of the set of program files that the first program file will likely require update for the proposed programming task, wherein the probability is determined based on the history of changes.

20. The computer program product of claim 18, wherein the visual cues associated with the recommendation include a color coding of the set of program files or existing versions of the set of program files based on probabilities that the set of program files or existing versions of the set of program files will need to be updated for the proposed programming task, wherein the probabilities are determined based on the history of changes.

* * * * *